(12) United States Patent
Kmita et al.

(10) Patent No.: US 6,415,970 B1
(45) Date of Patent: Jul. 9, 2002

(54) VEHICLE ARTICLE CARRIER WITH SUPPORTS CONFIGURABLE ELEVATED SIDERAILS OR FLUSH MOUNTED SLATS

(75) Inventors: Gerard J. Kmita, Allen Park; Milton J. Antonick, Royal Oak; Brett J. Borella, Bloomfield Hills, all of MI (US)

(73) Assignee: JAC Products, Inc., Ann Arbor, MI (US)

( * ) Notice: Subject to any disclaimer, the term of this patent is extended or adjusted under 35 U.S.C. 154(b) by 20 days.

(21) Appl. No.: 09/694,049

(22) Filed: Oct. 20, 2000

(51) Int. Cl.[7] .................................................. B60R 9/04
(52) U.S. Cl. ...................... 224/326; 224/309; 224/321
(58) Field of Search ................................. 224/309, 321, 224/325, 326

(56) References Cited

U.S. PATENT DOCUMENTS

| 3,615,069 | A | | 10/1971 | Bott | |
|---|---|---|---|---|---|
| 4,146,198 | A | | 3/1979 | Bott | |
| 4,343,419 | A | * | 8/1982 | Mareydt | 224/326 |
| 4,428,517 | A | | 1/1984 | Bott | |
| 4,448,336 | A | | 5/1984 | Bott | |
| 4,588,117 | A | * | 5/1986 | Bott | 224/321 |
| 4,768,691 | A | * | 9/1988 | Stapleton | 224/321 |
| 4,911,348 | A | * | 3/1990 | Rasor et al. | 224/321 |
| 5,016,799 | A | * | 5/1991 | Stapleton | 224/326 |
| 5,497,925 | A | * | 3/1996 | Lumpe et al. | 224/309 |
| 5,511,708 | A | * | 4/1996 | Cronce et al. | 224/321 |
| 5,588,572 | A | * | 12/1996 | Cronce et al. | 224/321 |
| 5,794,826 | A | * | 8/1998 | Cronce et al. | 116/200 |

FOREIGN PATENT DOCUMENTS

| JP | 411263167 A | * | 9/1999 | 224/321 |

* cited by examiner

Primary Examiner—Gregory M. Vidovich
(74) Attorney, Agent, or Firm—Harness, Dickey & Pierce, PLC

(57) ABSTRACT

A vehicle article carrier system having an elongated siderail which can be configured in a first configuration as a slat of the system or in a second configuration as a siderail of the system. The elongated support rail requires no modification before same can be used in either a slat-based or a siderail-based vehicle article carrier system. Either configuration can be used to support one or more cross bars and conventional bracket assemblies directly on the support rails.

8 Claims, 3 Drawing Sheets

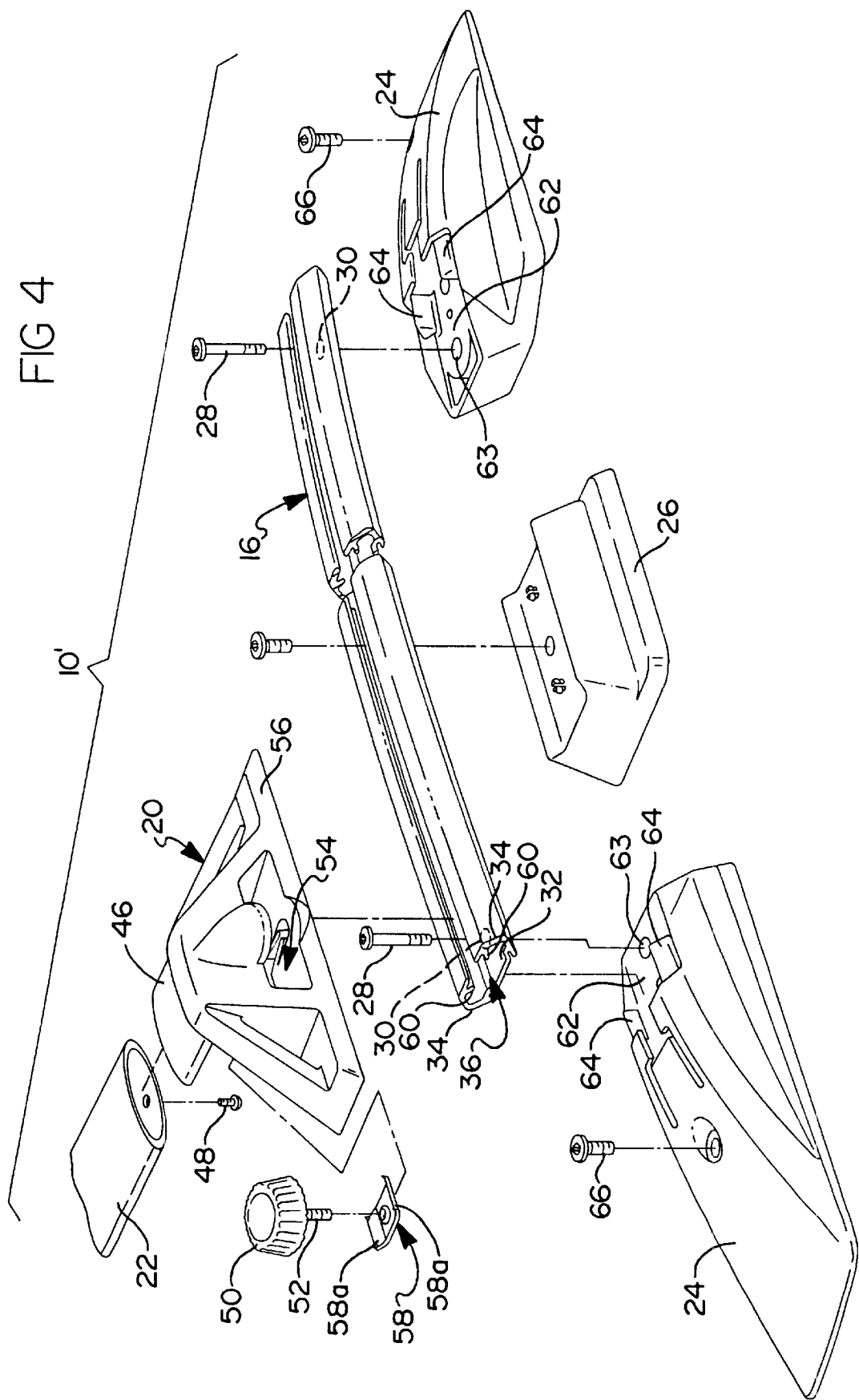

VEHICLE ARTICLE CARRIER WITH SUPPORTS CONFIGURABLE ELEVATED SIDERAILS OR FLUSH MOUNTED SLATS

TECHNICAL FIELD

This invention relates to vehicle article carrier systems, and more particularly to a vehicle article carrier system incorporating a support rail which may be configured either as a slat mounted against the outer body surface of the vehicle or as an elevated side rail.

BACKGROUND OF THE INVENTION

Vehicle article carriers are used in a wide variety of applications to support articles thereon. In some configurations, the vehicle article carrier will comprise what is generally known in the industry as a "slat". The slat is essentially an elongated support rail, often including an integrally formed, elongated channel, which is adapted to be positioned directly against the outer body surface, with possibly only a resilient pad separating the rail from direct contact with the outer body surface. The slat has a very low, highly aerodynamic profile.

In another configuration of a vehicle article carrier, a support rail is provided which is generally termed in the art a "side rail". The side rail is supported at a distance above the outer body surface, typically by a pair of support feet or other like elements. The distance above the outer body surface may vary but is typically between about 2"–4" above the outer body surface. Thus, the side rail does not have the low profile appearance of a slat but yet provides an additional degree of clearance between articles carried thereon (or on a separately mounted cross bar disposed on the siderail) and the outer body surface of a vehicle.

At present, elongated support rails are specifically designed for use as either a slat or a side rail in a vehicle article carrier system. Thus, it has heretofore not been possible to use one rail as both a slat or a side rail without significant modifications to the support rail or the elements intended to secure it to the outer body surface of the vehicle. However, it would be highly desirable to provide such a system wherein a single rail can be used either as a slat, and therefore secured directly to an outer body surface of a vehicle, or as a side rail, wherein it is secured at an elevated position above the outer body surface by a pair of suitable supports. Such a vehicle article carrier would provide a significant degree of flexibility to vehicle manufacturers and allow fewer independent component parts to be carried as inventory. More specifically, a vehicle manufacturer would be able to use a single support rail as part of a slat-based vehicle article carrier system or a side rail-based vehicle article carrier system.

Accordingly, it is a principal object of the present invention to provide a vehicle article carrier system having a common, elongated support rail which can be used either as a slat or as a side rail to support articles thereon, and without any modifications being required to the support rail.

It is still a further object of the present invention to provide a vehicle article carrier system wherein a single elongated support rail can be used to form a slat or an elevated side rail of a vehicle article carrier system, and which can also be used with a conventional cross bar and bracket arrangement for supporting the cross bar thereon.

SUMMARY OF THE INVENTION

The above and other objects are provided by a vehicle article carrier system in accordance with preferred embodiments of the present invention. The vehicle article carrier system generally comprises an elongated support rail which can be configured either as a slat or as a side rail of the vehicle article carrier system. The elongated side rail is formed to provide an elongated channel. A conventional cross bar having a pair of bracket members at each end thereof may be secured adjustably to the elongated support rail to thereby permit adjustable positioning of the cross bar along the elongated support rail.

In a first configuration, the elongated support rail is configured as a slat by positioning it against the outer body surface of the vehicle and securing it to the outer body surface via a plurality of threaded fasteners. A pair of end caps may be used to close off the opposite ends of the slat and provide a finished, decorative appearance thereto.

In a second configuration the elongated support rail is mounted via a pair of mounting support feet in an elevated configuration to form a siderail. The opposite ends of the siderail engage with mounting portions of each of the support feet. The conventional cross bar and bracket members thereof can also be secured to the siderail without any modification being required to the siderail. Optionally, a center support may be secured to the outer body surface of the vehicle and used to provide additional support to a central area of the siderail.

The vehicle article carrier system of the present invention thus allows a single elongated support rail to be used either as a slat or a siderail in a vehicle article carrier system. This reduces the number of independent component parts that a vehicle manufacturer needs to maintain in inventory and allows vehicle manufacturers to quickly and easily configure a slat-based vehicle article carrier system or a siderail-based system.

BRIEF DESCRIPTION OF THE DRAWINGS

The various advantages of the present invention will become apparent to one skilled in the art by reading the following specification and subjoined claims and by referencing the following drawings in which:

FIG. 4 is an exploded perspective view of the elongated support rail and its associated support feet which are used to mount the support rail as a side rail as shown in FIG. 2.

DETAILED DESCRIPTION OF THE PREFERRED EMBODIMENTS

Figure 1:
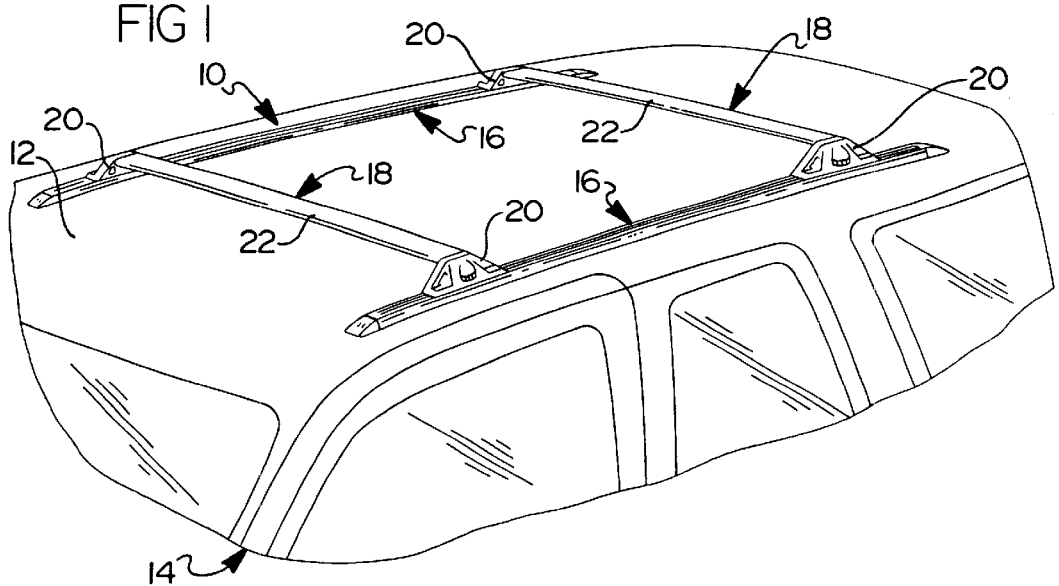
FIG. 1 is a perspective view of a vehicle incorporating a vehicle article carrier system in accordance with a preferred embodiment of the present invention, wherein the vehicle article carrier system includes elongated support rails configured as slats.

Referring to FIG. 1, there is shown a vehicle article carrier system 10 in accordance with a preferred embodiment of the present invention. The vehicle article carrier system 10 is disposed on an outer body surface 12 on a motor vehicle 14. FIG. 1 shows the system 10 in a first configuration, wherein a pair of elongated support rails 16 are disposed as "slats" along a major longitudinal length of the vehicle 14 and secured closely adjacent the outer surface 12 of the vehicle, and generally parallel to one another. Optionally, but preferably, one or more cross bar assemblies 18 are secured to the support rails 16 via a plurality of bracket members 20. The bracket members 20 are disposed at opposite ends of each cross bar 22 of each cross bar assembly 18.

In the configuration shown in FIG. 1, the support rails 16 have a very low, aerodynamic profile. The support rails 16 are secured to the outer body surface 12 by a plurality of conventional threaded fasteners.

Figure 2:
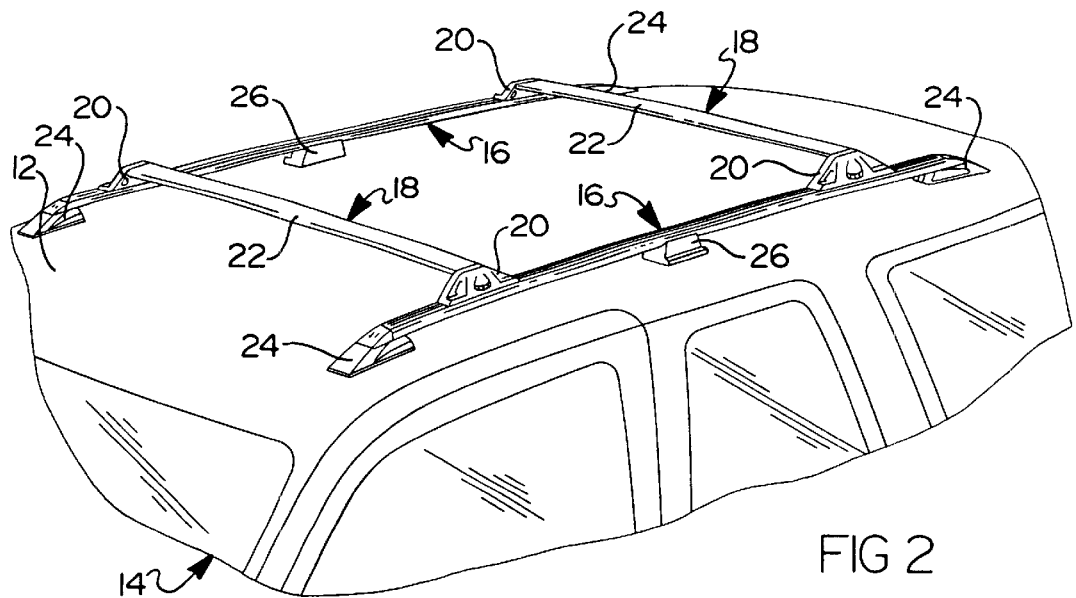
FIG. 2 illustrates the vehicle article carrier system of the present invention incorporating siderails.

It is a principal advantage of the present invention that the elongated support rails 16 which are shown in FIG. 1 secured to the outer body surface 12 in the form of slats can be used with no modification whatsoever as "siderails" in an alternative preferred embodiment of the article carrier system 10. This alternative preferred system is shown in FIG. 2 and designated by reference numeral 10'. The elongated support rails 16 each form siderails which are disposed elevationally above the outer body surface 12 by a plurality of support feet 24. Optionally, center supports 26 can also be included to provide even further support to the central areas of the support rails 16. Since no modification whatsoever is required to the elongated support rails 16, vehicle manufacturers can use the support rails 16 to quickly and easily form either a slat-based or a siderail-based article carrier system depending upon user preferences and/or the specific type of vehicle on which the article carrier 10 is mounted. Reducing the inventory of component parts needed to be maintained on hand to form each type of article carrier system also helps to reduce the overall cost of the particular system that is selected.

Figure 3:
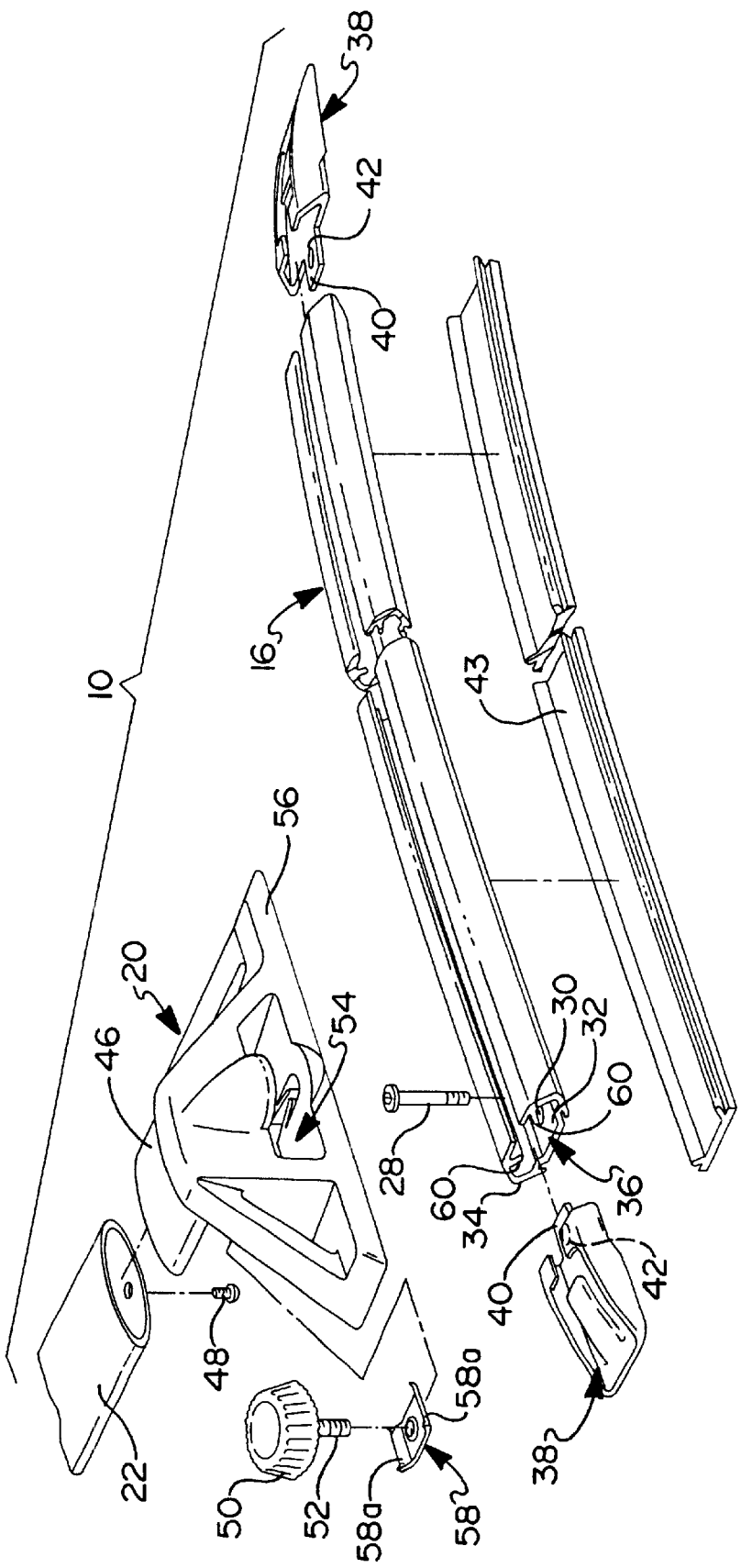
FIG. 3 is an exploded perspective view of the elongated support rail in connection with a pair of end caps that may be used in connection with the slat-based configuration shown in FIG. 1, together with a conventional cross bar and bracket assembly which may be secured to the support rail.

Referring to FIG. 3, when the elongated support rail 16 is to be used as a slat, it is preferably secured to the outer body surface of the vehicle by a plurality of conventional threaded fasteners 28 which extend through a corresponding plurality of holes 30 in a bottom wall 32 of the support rail 16. The support rail 16 also includes a pair of sidewalls 34 which help to form a channel 36 which extends preferably along the entire length of the support rail 16. The support rail 16 may be formed from a variety of materials and by a variety of manufacturing processes, but in one preferred form is extruded from aluminum. A roll formed construction is also possible.

To close off the open ends of the support rail 16, a pair of decorative end caps 38 may be secured to the opposite ends of the support rail 16. The end caps 38 preferably provide a tongue portion 40 having a hole 42 through which the fastener 28 may extend to thus secure the end cap 38 and the support rail 16 jointly to the outer body surface 12 of the vehicle 14. Optionally, but preferably, a resilient mounting pad 43 may be disposed between the support rail 16 and the outer body surface 12.

Also shown in FIG. 3 is a conventional bracket assembly 54 which is engaged at one end of one of the cross bars 22 to support the cross bar 22 on the support rail 16. A neck portion 46 is shaped to fit within the cross bar 22 and is secured thereto by a conventional threaded fastener 48. A user actuatable locking knob 50 having a threaded shaft 52 is disposed within an open area 54 of a frame portion 56 of the bracket assembly 44. The threaded shaft 52 threadably engages with a tap plate 58 which is disposed within the channel 36 of the support rail 16. By use of the locking knob 50 and the tap plate 58, the bracket assembly 44 can be locked at predetermined positions along the length of the support rail 16.

With further reference to FIG. 3, it will be noted that the tap plate 58 includes angled edge portions 58a and that the support rail 16 includes a pair of inwardly extending flanges 60. The edge portions 58a are formed to extend at an angle to place same generally flush against the flanges 60 when the tap plate 58 is in locking engagement within the channel 32 of the support rail 16. This subject matter is also the subject of co-pending U.S. application Ser. No. 09/693,763, filed concurrently herewith.

Referring now to FIG. 4, the components needed to form the siderail-based vehicle article carrier 10' of FIG. 2 can be seen. In this configuration, the elongated support rail 16 is secured to end supports 24 and optionally, but preferably, center support 26. Each of end supports 24 include a mounting portion 62 having a pair of tongue portions 64. The tongue portions 64 are adapted to engage within the channel 36 of the support rail 16. Threaded fasteners 28 are used to fixedly secure the opposite ends of the support rail 16 to threaded bores 63 in each end support 24. Each of the support feet 24 can be secured directly to the outer body surface 12 via one or more conventional threaded fasteners 66. If the center support 26 is incorporated, then this component may also be secured directly to the support rail 16 by one or more threaded fastening members extending through openings (not shown) in the bottom wall 32 of the support rail 16.

From the foregoing, it will be apparent that no modifications are required to the elongated support rail 16 before same is able to be used either in a slat-based vehicle article carrier system or a siderail-based vehicle article carrier system. This reduces the inventory required to be maintained by a vehicle manufacturer and allows slat-based or siderail-based vehicle article carrier systems to be constructed depending upon user preferences and/or the specific type of vehicle on which the system 10 or 10' is mounted. Advantageously, a common cross bar assembly can be used with the support rail when it is configured either as a salt or a siderail.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A vehicle article carrier system adapted to be secured to an outer body surface of a vehicle for positioning a pair of supporting rails in a selected one of an elevated position and a flush mounted position, relative to said outer body surface, without modification of said elongated support rails, comprising:

a cross bar for supporting articles thereon;

a pair of elongated support rails adapted to be fixedly secured relative to said outer body surface and extending along a major longitudinal length of said vehicle, for supporting said cross bar thereon;

said elongated support rails being configurable in a selected one of a first configuration and a second configuration;

said first configuration comprising disposing said elongated support rails substantially against said outer body surface via a plurality of fastening elements secured to said elongated support rails and said outer body surface;

said second configuration comprising supporting said support rails above said outer body surface in an elevated orientation by at least two pairs of support feet with each said pair of support feet serving to support its associated said elongated support rail in said elevated orientation such that a lower surface of each said elongated support rail is spaced apart from said outer body surface by a height of said support feet;

wherein no modification is required to said elongated support rails prior to securing same in either of said first or second configurations; and wherein openings are formed in each of said elongated support rails for securing said support rails, via said fastening elements, to either said outer body surface or said support feet.

2. The article carrier system of claim 1, further comprising a pair of end caps disposed at opposite ends of said support rails for assisting in securing said support rails substantially against said outer body surface.

3. The article carrier system of claim 1, further comprising a pair of bracket members disposed at opposite ends of said cross bar, said bracket members being adjustably securable to said elongated support rails to permit adjustable positioning of said cross bar at a plurality of positions along said elongated support rails.

4. The article carrier system of claim 3, wherein said bracket members each comprise a user engageable locking member being rotatable and having a threaded shaft; and a pair of tap plates, each said tap plate being associated with one of said elongated support rails and operating to engage with an associated one of said locking members to allow an associated one of said bracket members to be fixedly secured to said associated elongated support rail.

5. A vehicle article carrier system adapted to be secured to an outer body surface of a vehicle for positioning a pair of elongated support rails in a selected one of an elevated position and a flush mounted position, relative to said outer body surface, without modification of said support rails, comprising:

a cross bar for supporting articles thereon;

a pair of elongated support rails adapted to be fixedly secured relative to said outer body surface and extending along a major longitudinal length of said vehicle, for supporting said cross bar thereon;

said elongated support rails being configurable in a selected one of a first configuration and a second configuration;

said first configuration comprising disposing said elongated support rails substantially against said outer body surface via a plurality of fastening elements secured to said support rails and said outer body surface so that said support rails form slats upon which said cross bar can be supported; and said second configuration comprising supporting each of said elongated support rails above said outer body surface in an elevated orientation by at least a pair of associated support feet, said support feet being secured between a lower surface of its associated said support rail and said outer body surface, such that said support rails form a pair of side rails, each of said support feet having a mounting portion adapted to slidably engage with an end of its associated said support rail, and each of said support feet being securable directly to said outer body surface; and wherein no modification is required to said elongated support rails prior to securing same in either of said first or second configurations, wherein openings are formed in each of said elongated support rails for securing said support rails, via said fastening elements, to either said outer body surface or said support feet.

6. The vehicle article carrier system of claim 5, further comprising a pair of end caps adapted to be slidably inserted into opposite ends of an associated one of said support rails for assisting in securing said support rails substantially against said outer body surface.

7. The vehicle article carrier system of claim 5, further comprising a pair of resilient mounting pads adapted to be placed directly against said outer body surface, for supporting said support rails thereon when said support rails are secured in said first configuration.

8. The vehicle article carrier of claim 5, further comprising a center support having a mounting portion adapted to nestably engage with an associated one of said support rails to thereby provide additional support to said support rail when said support rail is configured in said second configuration.

* * * * *